United States Patent
Krause et al.

(10) Patent No.: US 7,856,238 B2
(45) Date of Patent: Dec. 21, 2010

(54) METHOD FOR MOBILE TO INFORM BASE STATION OF ADDITONAL GPS CAPABILITIES

(75) Inventors: David J. Krause, Kenosha, WI (US); Thomas M. Wied, Franklin, WI (US)

(73) Assignee: Motorola, Inc., Schaumburg, IL (US)

( * ) Notice: Subject to any disclaimer, the term of this patent is extended or adjusted under 35 U.S.C. 154(b) by 327 days.

(21) Appl. No.: 11/549,715

(22) Filed: Oct. 16, 2006

(65) Prior Publication Data
US 2008/0090587 A1 Apr. 17, 2008

(51) Int. Cl.
*H04W 24/00* (2009.01)
(52) U.S. Cl. ............... 455/456.6; 455/404.2; 455/435.1; 455/441; 455/440; 340/988
(58) Field of Classification Search ............... 455/456.1, 455/277.1, 404.2, 435.1, 441, 440; 342/357.05, 342/357.15; 370/332, 328; 340/988
See application file for complete search history.

(56) References Cited

U.S. PATENT DOCUMENTS

| | | | | |
|---|---|---|---|---|
| 6,081,229 A * | 6/2000 | Soliman et al. | ......... | 342/357.05 |
| 6,140,956 A * | 10/2000 | Hillman et al. | ......... | 342/357.31 |
| 7,295,156 B2 * | 11/2007 | Van Wyck Loomis | .. | 342/357.15 |
| 2002/0111169 A1 * | 8/2002 | Vanghi | ......................... | 455/436 |
| 2003/0045305 A1 * | 3/2003 | Ogino et al. | ................. | 455/456 |
| 2004/0219931 A1 * | 11/2004 | Bi et al. | ..................... | 455/456.1 |
| 2005/0059415 A1 * | 3/2005 | Easo et al. | ................. | 455/456.3 |
| 2006/0014517 A1 * | 1/2006 | Barclay et al. | ............ | 455/404.2 |
| 2006/0121870 A1 * | 6/2006 | Chu | ......................... | 455/277.1 |
| 2006/0209801 A1 * | 9/2006 | Joshi et al. | ................... | 370/352 |
| 2006/0217129 A1 * | 9/2006 | Katsumata et al. | ........ | 455/456.1 |

FOREIGN PATENT DOCUMENTS

| EP | 1580569 | * | 4/2007 |
|---|---|---|---|
| EP | EP1580569 B1 | | 4/2007 |

OTHER PUBLICATIONS

Applicant Admitted Prior Art (AAPA).*
Telecommunications Industry Association Position Determination Service for cdma2000(R) Spread Spectrume Systems. Apr. 2004.*
Telecommunications Industry Association "Position Determination Service for cdma2000(R) Spread Spectrum Systems"; TIA-801-A; Apr. 2004.
European Patent Office "Notification of Transmittal of the International Search Report and the Written Opinion of the International Seraching Auhtority or the Declaration"; PCT/US2007/080416; (Paper issued by ISA in related PCT application); 2880-05-06.

* cited by examiner

*Primary Examiner*—Nick Corsaro
*Assistant Examiner*—Quan M Hua
(74) *Attorney, Agent, or Firm*—Bryan W. Bockhop; Bockhop & Associates, LLC

(57) ABSTRACT

In a method of configuring a mobile communication between a position determination entity and a mobile device, an indication that the mobile device has an ability to perform a positioning system search simultaneously with a communication is sent to the position determination entity. A preferred response quality indicator is set to a state that will allow the mobile device an extended period to provide to a location of the mobile device to the position determination entity when the mobile device has the ability to perform a positioning system search simultaneously with a communication.

19 Claims, 2 Drawing Sheets

METHOD FOR MOBILE TO INFORM BASE STATION OF ADDITONAL GPS CAPABILITIES

BACKGROUND OF THE INVENTION

1. Field of the Invention

The present invention relates to mobile telephony and, more specifically, to a two-channel CDMA mobile telephone system.

2. Background of the Invention

Mobile telephones employ several different communication standards. One contemporary mobile device standard is referred to as "3GPP2," which employs "code division multiple access (CDMA) technology. CDMA is a signal processing technology employing spread-spectrum communications. CDMA does not assign a specific frequency to each communication, but rather uses the full available spectrum with communications encoded in digital sequences. Some CDMA-capable mobile devices employ the ability to communicate simultaneously via two separate channels via two separate transceivers.

The emergency dispatch system allows telephone users to contact an emergency dispatch center by dialing an emergency number. (The standard emergency number in the United States is "9-1-1.") Once a 9-1-1 call is received, the emergency dispatch center locates the caller and dispatches the appropriate responder (e.g., police department or fire department) to the location of the call. Locating the caller is easy when the call originates from a fixed land line, as the calling telephone is always at fixed location stored in a database that is accessible to the emergency dispatch center. However, locating the caller is more difficult when the call originates from mobile telephone, as the mobile telephone is generally not at a fixed location. One method of locating a mobile telephone is to triangulate the general location of the mobile telephone by calculating the signal return time from several different cellular telephone towers. This method does not provide a precise result due to inherent limitations in the distance measurement capabilities of the cellular system.

Some cellular telephones include a global positioning system (GPS) circuit that is used to make a precise determination of location using GPS satellite information. Typically, when a GPS-capable system initiates a call, it first triangulates the general location from the cellular towers that it is communicating with. Then it receives information of a cellular network position determination entity (PDE) regarding the nearest GPS satellites from which it may receive position data. The system then acquires GPS location data from the satellites and transmits the data to the PDE, which calculates and stores the precise location of the mobile device.

Typically, this is done by suspending transmission on the communications channel of the communications channel while the location is being determined. In some systems, the mobile device switches between voice communication and satellite communication in alternating two second blocks. This results in a poor experience for the parties participating in a conversation. A preferred response quality (PRQ) period is set by the PDE and corresponds to the amount of time that the mobile device has to acquire GPS location data and transmit the data to the PDE. A longer PRQ results in a more precise location determination. However, a longer PRQ also results in degraded communications signal quality, as transmission on communications signal bandwidth is suspended during the GPS data acquisition process. To limit communications degradation, the PRQ is currently limited to 16 seconds in most standards. However, such a limited PRQ may not be sufficient to provide a precise location of the mobile device.

In GPS sessions on 3GPP2 networks, most phones use time-multiplexed GPS searches to look for satellites. This leaves gaps in the audio and provides a poor user experience. Because of this, one mobile service provider has set the timeout for the mobile to report GPS measurements to 16 seconds. In the past, this setting was 32 seconds or longer, but it was reduced to minimize user complaints about audio gaps. Some new CDMA phones contain two receive chains, and allow simultaneous searches of GPS and CDMA. However, the network element responsible for sending the GPS search parameters to the mobile device typically does not know the mobile's capabilities so it can tune the parameters accordingly.

Therefore, there is a need for a mobile communications system that allows an extended PRQ without degrading the quality of communications transmitted over the system.

SUMMARY OF THE INVENTION

The disadvantages of the prior art are overcome by the present invention which, in one aspect, is a method of configuring a mobile communication between a position determination entity and a mobile device. As part of the method, an indication that the mobile device has an ability to perform a positioning system search simultaneously with a communication is sent to the position determination entity. A preferred response quality indicator is set to a state that will allow the mobile device an extended period to provide to a location of the mobile device to the position determination entity when the mobile device has the ability to perform a positioning system search simultaneously with a communication.

In another aspect, the invention is a method of indicating a position of a mobile device to a communications network, in which a call is initiated by the mobile device to the communications network. A request is received from the communications network for an indication of whether the mobile device has a capability to execute more than one communication simultaneously. The indication of whether the mobile device has a capability to execute more than one communication simultaneously is transmitted to the communications network. If the mobile device indicates that it has a capability to execute more than one communication simultaneously, then an extended period for the mobile device to provide location information to the communications network is set. If the mobile device does not indicate that it has a capability to execute more than one communication simultaneously, then a standard period for the mobile device to provide location information to the communications network is set.

In yet another aspect, the invention is a method of configuring a mobile communication between a position determination entity and a mobile device. An indication as to whether the mobile device has a two channel capability is received from the mobile device. If the mobile device has a two channel capability, then a preferred response quality indicator is set to a value that allows an extended period for the mobile device to provide global positioning system location information to the position determination entity. If the mobile device does not have a two channel capability, then the preferred response quality indicator is set to a value that does not allow an extended period for the mobile device to provide global positioning system location information to the position determination entity.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
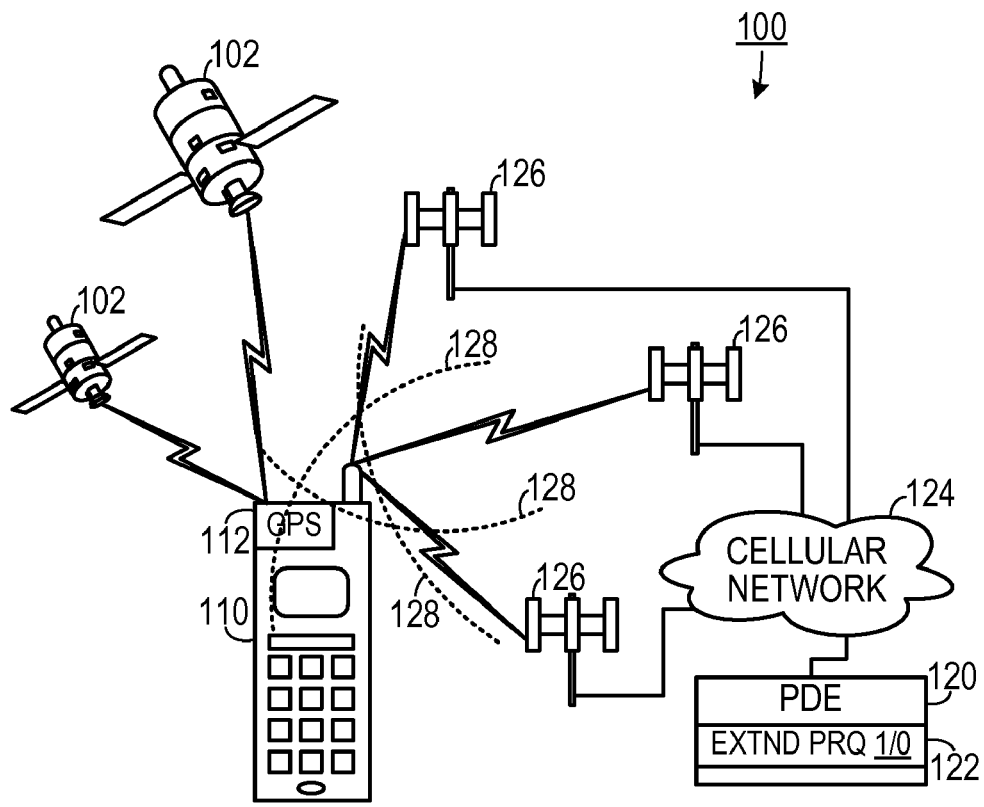
FIG. 1 is a schematic diagram of a mobile communications network.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, in one embodiment of a mobile communication system 100, a mobile device 110 (e.g., a CDMA-capable mobile telephone) that includes global positioning circuitry 112 receives positioning input from one or more global positioning satellites 102. The mobile device 110 communicates with one or more cellular towers 126, each of which is in communication with a cellular network 124. A position determining entity (PDE) 120 communicates with the mobile device 110 through the cellular network 124. The PDE 120 maintains a preferred response quality (PRQ) indicator 122 (which could be a single bit in one embodiment) associated with the mobile device 110 that indicates the amount of time allowed for the mobile device 110 to acquire location data and transmit it to the PDE 120.

In communicating with the cellular network 124, the mobile device 110 initiates a call to the cellular network 124 and sends an indicator of whether it is capable of communicating over two separate communications channels simultaneously. If the mobile device 110 is capable of simultaneous communication, the PDE 120 will set the PRQ indicator 122 to a state that indicates an extended PRQ will be allowed. In one embodiment, the PDE 120 will transmit to the mobile device 110 an indication of whether it has an extended PRQ.

In locating the mobile device 110, the PDE 120 determines an initial approximation of the location of the mobile device 110 by measuring signal transit time from the cellular towers 126 to the mobile device 110 and back. In the 3GPP2 standard, the mobile device 110 measures the time difference of arrival of the various signals from the cellular towers and reports the time differences to the PDE 120. The PDE 120 triangulates the measurements (represented by arcs 128) and then, based on the approximate location of the mobile device 110, sends the mobile device 110 information indicating which satellites 102 the global positioning circuitry 112 is to acquire positioning data from in order to determine a precise location for the mobile device 110. The mobile device 110 then communicates the positioning data to the PDE 120, which then calculates the precise location of the mobile device 110.

Figure 2:
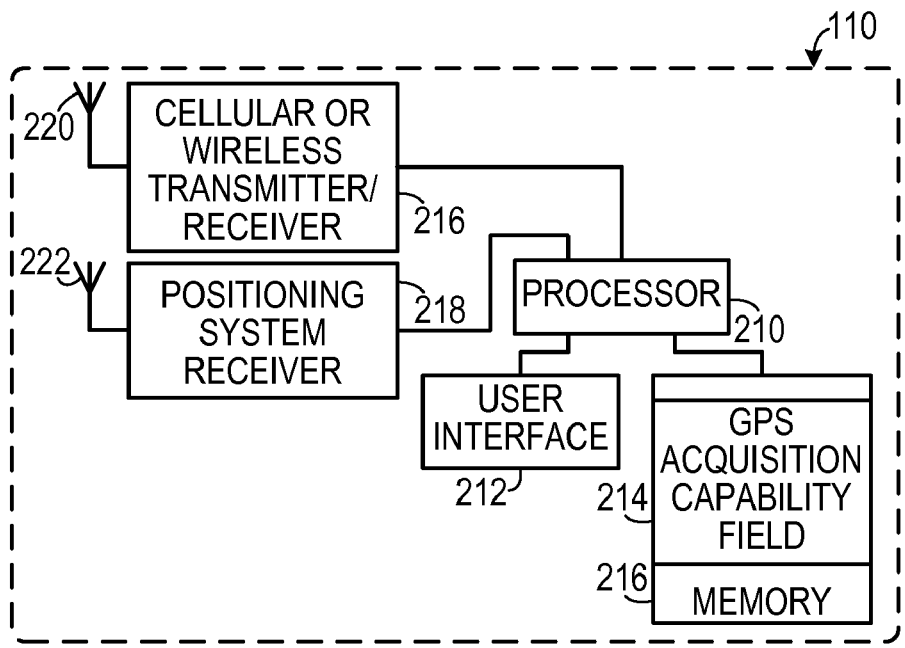
FIG. 2 is a block diagram of a mobile communications device.

A typical mobile device 110 that could take advantage of an extended PRQ, as shown in FIG. 2, could include a processor 210 in communication with a cellular or wireless transmitter/receiver unit 216 that is coupled to a first antenna 220. The processor 210 is also in communication with a positioning system receiver 218 that is coupled to a second antenna 222. The processor 210 can also transmit data and audio to and from a user interface 212. A memory 216 stores data for use by the processor 210 and includes a GPS acquisition capability field 214 that stores information about whether the mobile device 110 is capable of communicating over two channels simultaneously.

Figure 3:
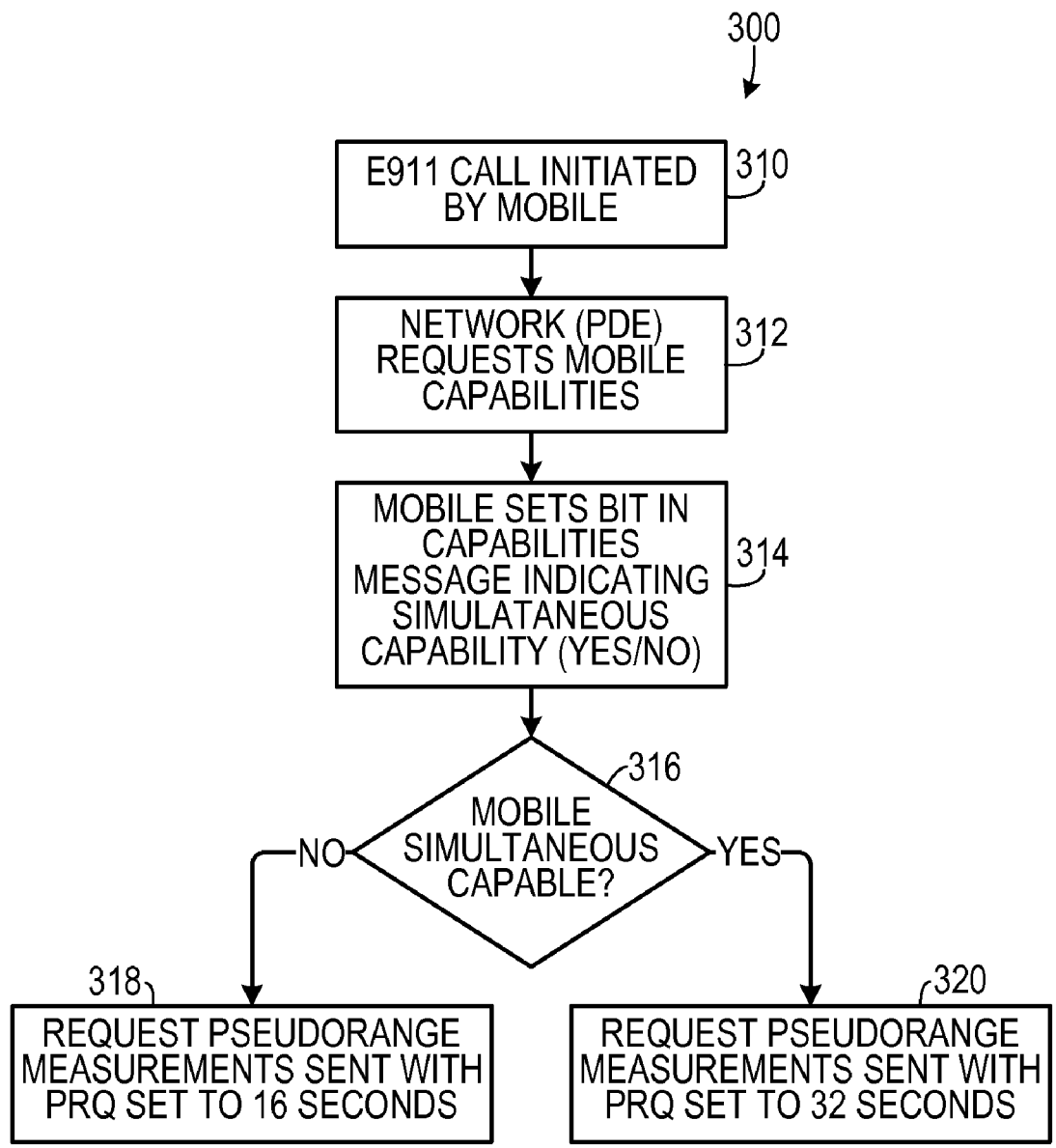
FIG. 3 is a flow chart showing a method of providing mobile communications device capability information to a mobile communications network.

In one embodiment of a method 300 of communicating with a cellular network, as shown in FIG. 3, when a call is initiated by a mobile device 310, the PDE requests the capabilities of the mobile device 312 regarding the ability to communicate simultaneously via two separate channels. The mobile device transmits a capabilities message 314 that includes a bit that indicates whether the mobile device is capable of simultaneous communication. The PDE determines the value of the simultaneous capability bit 316 and if the mobile device does not have the capability of simultaneous communications, the PDE will set the PRQ to a non-extended period 318 (e.g., 16 seconds). On the other hand, if the mobile device is capable of simultaneous communications, then the PDE will set the PRQ to an extended period 320 (e.g., 32 seconds).

When the mobile device is capable of performing simultaneous communications, it will set a bit in the GPS Acquisition Capability field indicating its ability to do simultaneous GPS searches. In response, the PDE will increase the PRQ setting to allow the phone to search longer, since the audio would not be disrupted. The GPS Acquisition Capability field on certain current mobile devices has reserved bits that could be used for this.

There is no way for the PDE to know that the mobile will not be tuning away from CDMA, so it currently has to use a worst-case setting for PRQ. With the knowledge that the mobile is capable of simultaneous operation, the PDE will set PRQ to a longer value for simultaneous phones, allowing them to get better fixes in poor and indoor conditions.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of configuring a mobile communication between a position determination entity and a mobile device, comprising the steps of:

a. indicating to the position determination entity that the mobile device has an ability to perform a satellite-based global positioning system search simultaneously with a telephone communication; and b. setting a preferred response quality indicator to a first state that will allow the mobile device an extended period to provide location data about the mobile device to the position determination entity when the mobile device has the ability to perform a global positioning system search simultaneously with a telephone communication and setting the preferred response quality indicator to a second state that will not allow the mobile device an extended period to provide location data about the mobile device to the position determination entity when the mobile device does not have the ability to perform a global positioning system search simultaneously with a telephone communication.

2. The method of claim 1, wherein the indicating step comprises the step of setting a simultaneous communication bit in a positioning system acquisition capability field.

3. The method of claim 2, wherein the positioning system acquisition capability field is stored in the mobile device and further comprising the step of transmitting the positioning system acquisition capability field to the position determination entity.

4. The method of claim 1, wherein the indicating step is executed when the mobile device includes a capability to communicate over more than one channel simultaneously.

5. The method of claim 4, further comprising the step of employing a code division multiple access communications technology.

6. The method of claim 5, further comprising the step of sending communications over a first communications channel and receiving positioning system location data over a second communications channel.

7. A method of indicating a position of a mobile device to a communications network, comprising the steps of:
   a. initiating a call by the mobile device to the communications network;
   b. receiving a request from the communications network for an indication of capabilities of the mobile device;
   c. transmitting to the communications network an indication of whether the mobile device has a capability to execute a satellite-based global positioning system search simultaneously with a telephone communication;
   d. if the mobile device indicates that it has a capability to execute a satellite-based global positioning system search simultaneously with a telephone communication, then setting an extended period for the mobile device to provide location information to the communications network; and
   e. if the mobile device does not indicate that it has a capability to execute a satellite-based global positioning system search simultaneously with a telephone communication, then setting a standard period for the mobile device to provide location information to the communications network.

8. The method of claim 7, wherein the step of transmitting to the communications network the indication of whether the mobile device has a capability to execute more than one communication simultaneously comprises the step of transmitting a GPS acquisition capability field to the communications network.

9. The method of claim 8, further comprising the step of setting a simultaneous communication bit in a positioning system acquisition capability field.

10. The method of claim 9, wherein the positioning system acquisition capability field is stored in the mobile device.

11. The method of claim 7, wherein the step of transmitting to the communications network comprises the step of transmitting to a position determination entity.

12. The method of claim 7, wherein the step of setting an extended period for the mobile device to provide location information comprises transmitting a preferred response quality indicator to the mobile device that has a value that corresponds to an extended period.

13. The method of claim 12, wherein the indicating step is executed when the mobile device includes a capability to communicate over more than one channel simultaneously.

14. The method of claim 13, further comprising the step of employing a code division multiple access communications technology.

15. The method of claim 14, further comprising the step of sending communications over a first communications channel and receiving positioning system location data over a second communications channel.

16. A method of configuring a mobile communication between a position determination entity and a mobile device, comprising the steps of:
   a. receiving at the position determination entity from the mobile device an indication as to whether the mobile device has a simultaneous two channel capability;
   b. if the mobile device has a simultaneous two channel capability, then setting at the position determination entity a preferred response quality indicator to a value that allows an extended period for the mobile device to provide a global positioning system-acquired location to the position determination entity; and
   c. if the mobile device does not have a simultaneous two channel capability, then setting at the position determination entity the preferred response quality indicator to a value that does not allow an extended period for the mobile device to provide the global positioning system-acquired location to the position determination entity.

17. The method of claim 16, further comprising the step of sending audio communications over a first communications channel and receiving positioning system location data over a second communications channel.

18. The method of claim 16, further comprising the steps of:
   a. receiving at the position determination entity, from the mobile device, approximate location data;
   b. transmitting from the position determination entity, to the mobile device, positioning system satellite search window information, indicating a search window that the mobile device is to search for at least one positioning system satellite;
   c. receiving at the position determination entity, from the mobile device, satellite signal measurement data; and
   d. at the position determination entity calculating and storing a location for the mobile device based on the satellite signal measurement data.

19. The method of claim 16, wherein the step of receiving from the mobile device an indication as to whether the mobile device has a simultaneous two channel capability comprises receiving at the position determination entity a GPS acquisition capability field from the mobile device, in which the GPS acquisition capability field includes a bit that indicates simultaneous two channel capability when set.

* * * * *